United States Patent [19]

Bumpas

[11] 3,708,085
[45] Jan. 2, 1973

[54] ORGANIC GARBAGE TREATMENT RECEPTACLE

[76] Inventor: Orville C. Bumpas, P. O. Box 6802, North Augusta, S.C. 29841

[22] Filed: Aug. 18, 1971

[21] Appl. No.: 172,633

[52] U.S. Cl. ........................ 220/18, 220/4 R, 220/18, 220/34, 220/36
[51] Int. Cl. ............................................. B65d 43/16
[58] Field of Search ............. 220/18, 36, 4 R, 4 A, 34

[56] References Cited

UNITED STATES PATENTS

| 988,668 | 4/1911 | Short | 220/18 |
| 1,623,477 | 4/1922 | Horni | 220/34 |
| 2,016,558 | 10/1935 | Redrup | 220/36 |
| 1,509,798 | 9/1924 | Vance et al. | 220/36 |

Primary Examiner—Donald F. Norton
Assistant Examiner—Allan N. Shoap
Attorney—Townsend M. Belser, Jr.

[57] ABSTRACT

An underground receptacle for bacterial dissolution of organic food wastes comprised of a below-grade treatment chamber fed by a conical entrance conduit extending above the ground surface. A garbage receiving portal at the upper end of the conduit is covered by a lid and has a substantially airtight portal-to-lid seal. The lid is raised and lowered by a foot actuator which cooperates with it to minimize seal wear and provide positive seating and sealing action. The entrance conduit is detachably mounted upon the underground chamber and provision is also made to facilitate shipment and assembly of the treatment chamber.

6 Claims, 6 Drawing Figures

PATENTED JAN 2 1973
3,708,085
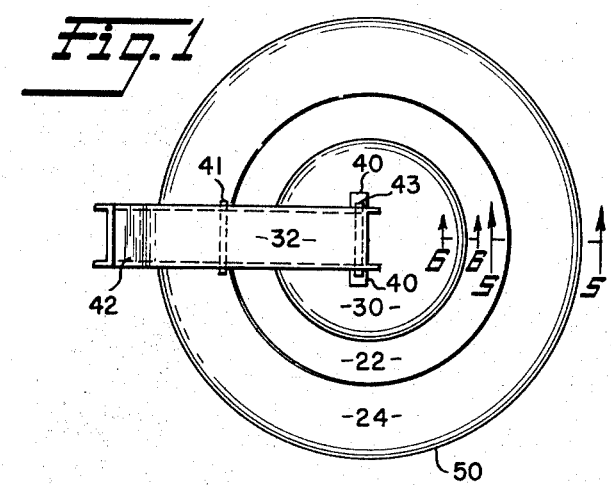
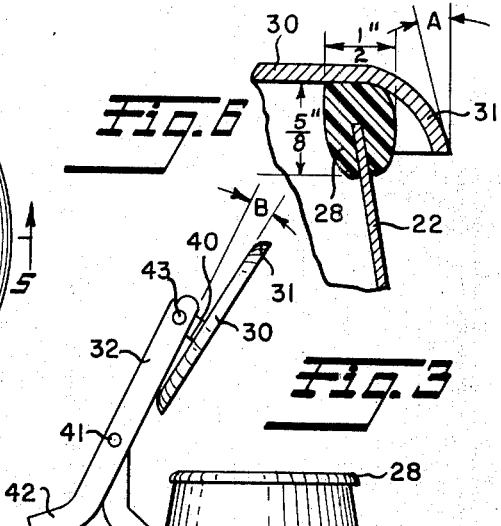
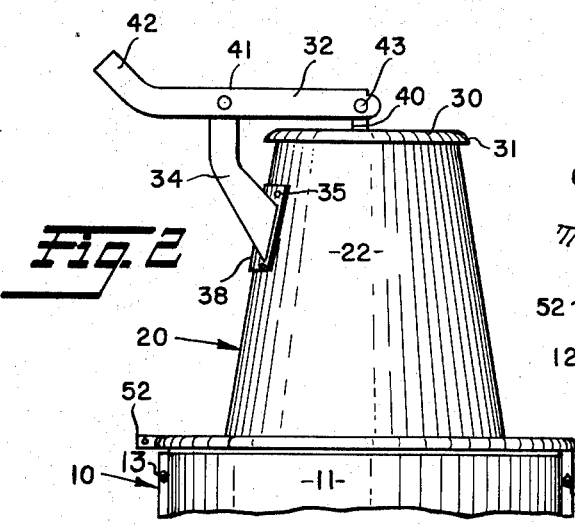
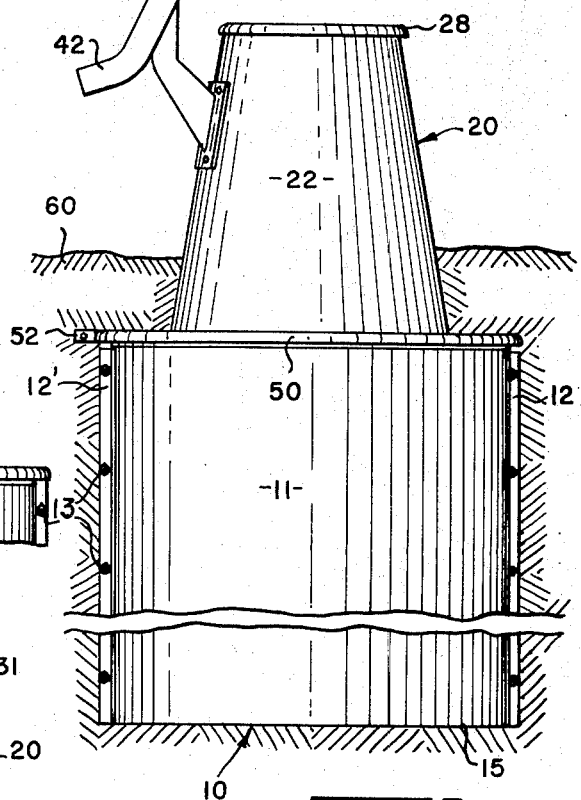
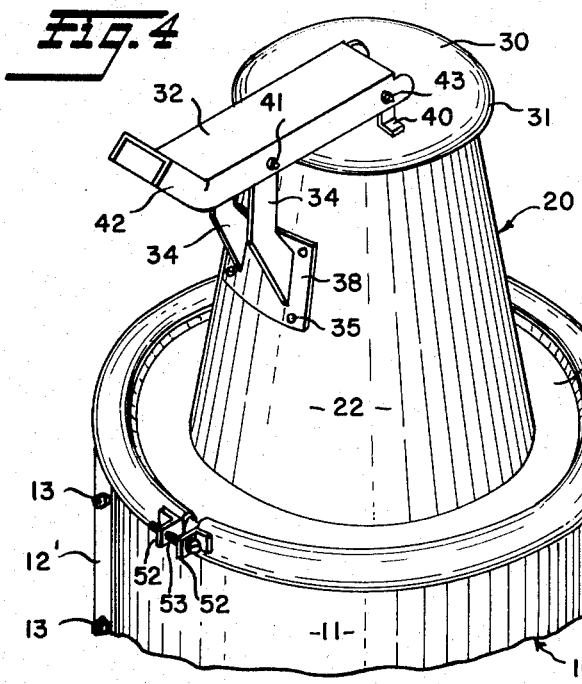
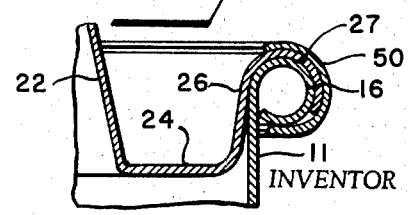
INVENTOR
ORVILLE C. BUMPAS
BY Townsend M. Belser, Jr.
ATTORNEY

ORGANIC GARBAGE TREATMENT RECEPTACLE

BACKGROUND OF INVENTION

This invention relates to an improved and novel receptacle for the treatment of organic food wastes. More specifically, the invention is directed to an underground treatment chamber or depository having an entrance conduit or channel extending above the ground surface and adapted to receive organic food waste and convey it to the underground chamber. The treatment chamber has a natural earth bottom to allow the liquid portion of the waste to drain off and seep into the ground. The entrance conduit is tightly covered by means of a novel lid or closure unit adapted to be raised and lowered by a foot treadle and, when seated, to positively exclude insects and animals and prevent the escape of noxious odors.

A portion of the refuse or waste generated by the human food cycle consists of organic food residue sometimes referred to as putrescible or "wet" garbage. The present invention contemplates the separation of all such organic wastes from the remaining solid wastes, the latter materials to be placed in a separate container for collection and transfer to a conventional solid waste dump or other garbage facility. Since wet garbage is generated wherever food is prepared and served, the treatment receptacle of the present invention finds widespread utility, particularly in those areas where little or no commercial garbage surface is available. The invention disclosed is especially suitable for use at seasonal vacation areas, such as camping, beach, and lake house sites, and near picnic and other outdoor recreational facilities.

With respect to handling solid waste materials, the collection and disposal of wet garbage poses one of the most troublesome and costly problems encountered in the field. Almost all sanitation difficulties associated with disposal of solid wastes are related to the organic or wet garbage component. When deposited in standard garbage cans at campsites and other areas, wet garbage attracts numerous flies and insects, along with a variety of rodents and other scavengers. In addition, wet garbage rapidly decays so that standard garbage and trash cans soon become offensively putrid and odorous.

In order to overcome the numerous problems associated with handling solid wastes containing wet garbage, the present invention was developed to provide an underground depository satisfactory for isolation and treatment of wet garbage at or near its point of origin. Under the system disclosed, the wet garbage component is immediately separated from all other solid wastes generated and is deposited in an underground container to which is also added a special bacterial activator that facilitates dissolution of the organic food material through bacterial action. The resulting bacterial action dehydrates and compacts the wet garbage by removing its water content, which accounts for approximately 85 percent of its volume, and leaves a 15 percent solids residue or compost. The bottom of the underground treatment container is open to the underlying earth so that the liquid will run off and seep into the subsoil in a manner similar to that employed by septic tanks. Since the volume of the water is eliminated, the solids buildup is relatively slow and such an underground system may operate for several years without cleaning out the residue. When such cleaning does become necessary, the solids residue constitutes an extremely rich compost that can be used as a valuable fertilizer material.

Although a few underground garbage containers are found in the prior art, there is usually no provision for actual treatment of the garbage. Where some type of treatment is provided, the container has proven to be unsanitary in use and uneconomical in operation. The loose and illsealed lids found on prior art devices, together with the accumulation of spilled garbage on surfaces adjacent to their portals, have resulted in the escape of noxious odors and in unsanitary conditions attracting numerous flies, rodents and other vermin. Existing lid structures are also deficient in that they are easily opened and unseated by wild or domestic animals seeking food and often become detached and even lost. Furthermore, prior art designs are difficult and costly to install and maintain and experience frequent mechanical failures. Problems of moisture condensation and buildup in the immediate vicinity of the excess opening have also been encountered with earlier units, further contributing to their odious and unsanitary condition and generally making them extremely unpleasant to operate. All of the foregoing difficulties encountered in earlier attempts to isolate and treat wet garbage on site are eliminated through the use of applicant's invention.

SUMMARY OF INVENTION

In view of the foregoing background and prior art, a principal object of the present invention is to provide a novel wet garbage treatment facility comprised of an underground chamber fed by an access conduit extending a short distance above the ground's surface. At the upper end of the conduit is an above-ground access opening or portal covered by a self-sealing lid of novel construction. A lid actuating mechanism permits the lid or cover component to be opened by foot pressure and closes automatically when the pressure is released. The underground chamber is also of a novel construction facilitating compact shipment as nested semi-cylindrical sections and on-site assembly.

Another object of the present invention is to provide a simple, convenient and efficient means for disposal of wet garbage at its place of origin so that it can be conveniently separated from dry garbage collected in a separate container for off-site disposal.

A further object of the present invention is to provide a receptacle and means for on-site treatment of wet garbage which is relatively inexpensive to install, use, and maintain.

A further object of the present invention is to provide a wet garbage treatment receptacle having a self-seating closure means that practically eliminates the intrusion of insects, rodents and other vermin, as well as wild and domestic animals.

Another object of the present invention is to provide a treatment receptacle for wet garbage having a closure means that is self-sealing and provides a substantially airtight seal preventing the escape of noxious odors and the attraction of flies, insects, rodents and other animals.

Still another object of the present invention is to provide an above-ground entrance channel or conduit to an underground wet garbage treatment chamber wherein the conduit extends only a short distance above the ground surface to minimize condensation and accumulation of odorous liquids around the entrance or portal thereto.

A further object of the present invention is to provide a conical entrance channel or conduit for underground garbage treatment chambers that eliminates accumulation of odorous residue on interior conduit walls while at the same time minimizing the effect of spillage on exterior conduit surfaces.

Another object of the present invention is to provide a sealed closure means for wet garbage treatment receptacles that minimizes seal wear and tear during normal opening and closing operations and maintain seal integrity throughout relatively long periods of use.

Another object of the present invention is to provide a snug fitting lid for the portal to a wet garbage treatment receptacle that is difficult to raise or unseat in any manner other than by correct operation of the lid actuating means.

A further object of the present invention is to provide a receptacle for on-site disposal of wet garbage and the decomposition and elimination thereof through bacterial action.

Still another object of the present invention is to provide a closure means for the entrance portal of wet garbage treatment receptacles wherein raising and lowering of the lid is unhampered by contact with the periphery or surrounding areas of the portal and the lid is self-sealing when in the closed position.

A further object of the present invention is to provide a conical entrance conduit and a foot operated closure that is readily adapted for use with standard cylindrical containers to form wet garbage treatment receptacles.

Another object of the present invention is to provide a covered receptacle for the treatment of wet garbage wherein the lid may be raised by a foot operated lifting mechanism that leaves the operator's hands free for depositing hand carried garbage.

A number of the foregoing objects are accomplished by the novel actuating mechanism for the receptacle cover or lid which has a lever arrangement utilizing a double-action pivotal movement in raising and lowering the lid means. The double-action lever arrangement, together with the lever-to-cover connection, constitutes one of the important features of the present invention.

DESCRIPTION OF DRAWINGS

For a better understanding of the present invention, reference is made to the accompanying drawing in which:

FIG. 1 is a plan view of the garbage treatment receptacle showing the foot treadle and lid in the closed position.

FIG. 2 is a fragmentary side elevation showing the entrance conduit over the underground treatment chamber and the actuator mechanism for the conduit lid.

FIG. 3 is a side elevation of the entire garbage treatment receptacle showing the conduit lid in the open position and the garbage treatment chamber installed beneath the ground surface.

FIG. 4 is a perspective fragmentary view of the entrance conduit as mounted upon the upper end of the garbage treatment chamber and shows the mounting structure of the lid actuator mechanism.

FIG. 5 is an enlarged fragmentary sectional view along lines 5—5 in FIG. 1 showing construction details of the supporting structure and clamping band fastener for detachably mounting the entrance conduit on the upper end of the garbage treatment chamber.

FIG. 6 is an enlarged fragmentary sectional view along lines 6—6 in FIG. 1 showing the construction details and sealing relationship of the seal around the conduit portal and the periphery of the conduit lid.

DETAILED DESCRIPTION OF PREFERRED EMBODIMENT

Referring now to the drawing and particularly to FIG.'s 3 and 4 thereof, there is illustrated one form of the wet garbage treatment receptacle made according to the present invention. In FIG. 3, the receptacle is shown installed in the ground with the treatment chamber, generally designated 10, below the ground surface 60 and the entrance conduit, generally designated 20, mounted upon the chamber 10 so as to extend a short distance above the ground surface in a position to receive and convey deposits of wet garbage to the treatment chamber below. Although it may be of a unitary construction, the underground chamber 10 is preferrrably comprised of a pair of semi-cylindrical wall sections 11—11 joined together to form a cylindrical chamber by means of two pairs of side flanges 12—12 and 12'—12', one flange of each pair extending along the length of the corresponding longitudinal edges of each semi-cylindrical section. The flanges stop short of the upper end of the sections so as not to interfere with the conduit mounting structure. Adjacent flanges 12 and 12' along opposing edges of the semi-cylindrical sections 11—11 can be secured together by any appropriate fastening means such as a series of threaded bolts and nuts 13. As an alternative, a section of U-shaped channel stock can be inverted and welded to one or the other of each pair of opposing flanges to form an interlocking channel member. The locking channel may either be in several short sections or in one long section extending longitudinally along the length of its corresponding supporting flange as is preferred. The treatment chamber 10 would then be assembled by slipping the free opposing flange of each pair into its corresponding locking channel from one end thereof and then sliding it down the channel until the upper and lower ends of the two semi-cylindrical sections are brought even to form the cylindrical chamber 10.

The lower ends of the wall sections making up cylindrical chamber 10 terminate in a flat edge 15 of wall section thickness without any bottom structure, the floor of chamber 10 being formed by the natural ground surface at the bottom of the hole or excavation in which the receptacle is installed. The upper ends of the semi-cylindrical wall sections are rolled to form a lip 16 as best illustrated in FIG. 5. Resting upon the lip 16 and covering the upper end of the cylindrical treatment chamber 10 is the entrance conduit or channel 20.

Conduit 20 is comprised of a conical section or cone 22 mounted upon a base supporting structure in the form of an annular skirt 24 that may be either integrally formed with cone 22 or cut out of a circular piece of sheet metal and welded as a separate component to the lower edge of cone 22. Around the outer edge of skirt 24 is an annular wall 26 rolled outwardly at its upper edge to form a radial supporting rim 27 adapted to fit over and frictionally engage lip 16 of the treatment chamber as illustrated in FIG. 5. To achieve such a fit, the inside radius of rim 27 is approximately equal to the outside radius of lip 16. The entrance conduit is detachably secured to the treatment chamber by means of a semi-circular locking ring 50 that partially encircles both rim 27 and lip 16 as shown in FIG. 5 of the drawing. The rim and lip are thereby clamped together when the ends of the locking ring are drawn together by tightening the nut and bolt fastener 53 extending through lugs 52—52 at each end of the ring. The lip 16 may have a wide variety of cross-sectional shapes and can be replaced structurally by a series of outwardly projecting lugs spaced at intervals around the upper end of the treatment chamber without altering the function and proper operation of the locking ring.

The conical section 22 of the entrance conduit is preferably made of sheet metal cut so as to generate a top-less cone or frustum having the dimensions and shape desired upon bending and welding the ends of the sheet metal blank together to form a three-dimensional structure. The upper edge of the conical section is preferably rounded to form a smooth lip around the conduit portal. A ring of resilient seal material, such as neoprene, having the cross-sectional shape and annular mounting channel shown by the details of FIG. 6, is mounted around the lip of the portal to form a lid gasket or seal 28. The upper opening or garbage receiving portal to the entrance conduit is covered by a lid 30 having a concave or hollow underside adapted to fit over and sealingly engage the resilient seal 28. In the preferred embodiment, the area of seal contact against the undersurface of the lid is sufficient to provide a transverse seal width of at least ⅜ inch.

A foot-operated actuator mechanism to raise and lower the lid 30 is mounted upon a pair of fulcrum brackets 34—34 secured to the exterior surface of the conical section 22 by means of an integrally welded support plate 38 rigidly fastened to the surface by bolts or studs 35. The lid actuator mechanism is comprised of an actuating lever 32 formed from an inverted section of channel iron stock pivotally mounted at 41 upon the upwardly projecting ends of support brackets 34—34 as illustrated in FIG. 4 of the drawing. Pivot pin 41 passes first through one channel wall, then through the projecting ends of the two intermediate fulcrum brackets, and finally through the other channel wall. The inner end of lever 32 is pivotally connected to the upper surface of lid 30 by means of a pair of right-angled lugs 40—40 and a pivot pin 43. The lid-to-lever connection at 43 is the second pivotal point utilized by the actuator mechanism and has almost the same structures as the fulcrum connection at 41 with lugs 40—40 substituted for brackets 34—34. At the outer end of lever 32 is a foot treadle 42 which in the preferred embodiment is comprised of a portion of lever 32 that has been bent upward at an angle of approximately 45° as shown in FIG. 2.

The positioning of the pivotal axis of lugs 40 in relation to the center of gravity of lid 30 constitutes an important feature of the present invention. As lid 30 is preferrably symmetrical, its center of gravity and geometric center are the same. With reference to FIG. 1 of the drawing, the pivotal axis defined by lug pin 43 is offset from the geometric center of lid 30 toward the fulcrum connection 41 (to the left of the lid center in FIG. 1) such that the center of gravity of the lid is outside of or beyond the lug axis in the opposite direction from the lever fulcrum. By reason of such novel construction, the lid 30 will always tilt firmly against the underside of lever 32 immediately upon being lifted clear of seal ring 28 as shown in FIG. 3. This tilting action facilitates centering and seating of the lid as it closes and ensures a tight sealing relationship between the underside of the lid and the seal ring 28 when the lid is in its closed position. Thus, the lid of the present invention achieves positive seating and sealing during repeated opening and closing of the lid.

Another important feature of the lid arrangement is the shape of the lid itself which facilitates self-alignment and a tight sealing engagement between the lid and the seal around the conduit portal and further produces a high integrity barrier against intrusion by scavenging wildlife. As previously indicated, the underside of lid 30 is of a hollow or concave shape. To produce that shape, the outer circumference or edge of the lid 30 is rolled downwardly to form an annular ridge 31 of roughly arcuate cross section which fits over the seal 28 as illustrated in FIG. 6 of the drawing. The underside of the lid rests on and conforms to the cross sectional shape of seal 28 for a sufficient distance to form the relatively wide band of sealing contact previously referred to. The angle that the lid's perpendicular axis (same as the cone axis when the lid is closed) makes with a line tangent to the projecting tip or lowest edge of ridge 31 is also of particular importance as this angle controls the clearance between the seal 28 and the ridge 31 as the lid is opened and closed. Due to the tilting movement of the lid 30, the ridge angle is related directly to the angle of tilt that a line normal to the lid axis (or the plane of the flat upper surface of the lid shown) makes with the longitudinal axis of the actuator lever 30 when the lid is in a raised position. Designating the ridge angle as angle A and the tilt angle as angle B, angle A must always be greater than or equal to angle B in order to prevent interference between the ridge 31 and the seal ring 28. Such interference can cause improper seating of the lid and excessive seal wear. In the preferred embodiment, angle A is approximately twice angle B. With the foregoing lid construction, the underside of the outermost portion of annular ridge 31 away from fulcrum axis 41 (in the area of section lines 6—6 in FIG. 1) will be the first lid area to come into contact with the seal 28. Since the lid will seat in this positive fashion every time it is opened and closed, the lid will always be properly centered and sealed after each garbage disposal operation and wear and tear on the seal from misalignment will be eliminated.

The angle of the conical section 22 as measured from the horizontal also constitutes an important aspect of the present invention. The conical shape selected must serve two functions of a somewhat conflicting nature. First, the conical shape prevents deposits of wet garbage from hitting and accumulating on the inside surfaces of the entrance conduit. The smaller the angle of slant or slope utilized in the cone, the closer it approaches the horizontal and the less likely are internal deposits in the conduit. On the other hand, a large angle of slant or slope decreases the likelihood of unsanitary deposits building up from garbage spilled around the portal on the exterior conduit surface. Where the cone is steep, little garbage can accumulate on outside surfaces and what does spill will be washed off by rain water. With the foregoing in mind, cone angles in the range of 65° to 82° have proven satisfactory. In the preferred embodiment, an angle of 80° is utilized. Also, to reduce the effects of exterior spillage and the amount of interior and exterior condensation of ordorous fluids, the receptacle is located at a below-grade elevation placing the portal to the entrance conduit 20 only a relatively short distance above the ground surface, the portal elevation being just sufficient to permit ready access to the portal and proper operation of the lid actuator mechanism.

With regard to the particular construction materials and dimensions employed in the preferred embodiment of the invention, the underground treatment chamber 10 is constructed from 18 gauge galvinized steel and measures 22 ½ inches in diameter by 48 inches in length. The entrance conduit 20 is preferrably made from 16 gauge galvinized steel and measures 18 inches high with an upper portal or orifice 10 inches in diameter and a base diameter of 16 inches to give a cone angle of approximately 80° to the horizontal. The lid 30 is of stamped metal construction utilizing a blank of 12 gauge galvinized steel and has a finished outside diameter of 11 ½ inches as measured across the projecting edge of ridge 31.

The fulcrum brackets 34—34 are spaced approximately 4 inches apart and are mounted on a support plate 38 measuring approximately 5 inches in width by 7 inches in length, both the brackets and the plates also being made from 12 gauge galvinized steel. The lid actuator lever 32 is formed from a 16 ½ inch section of 12 gauge channel iron 4 inches in width with side flanges 1 inch deep. The rear 4 inches of lever 32 are bent upward at an angle of 45° to form the foot treadle portion 42. Of particular importance are the relative locations of pivotal fulcrum axis 41 and pivotal lug axis 43. Axis 41 is chosen so that the greater length of lever arm, as well as the moment of lever rotation, is toward the lid end of the lever. As the lever moment is further supplemented by the weight of the lid structure, the actuator mechanism will always have a strong positive bias toward a firmly closed position. In the preferred embodiment the pivot point 41 is 8 inches from the outer end of the lever treadle, the counter-balancing weight being further reduced by the shift in the center of gravity caused by the upward bend of the foot treadle portion. The lid pivotal axis 43 is located ¾ of an inch from the inner end of the lever and 7 ¾ inches from the fulcrum pivot 41. As previously disclosed, the connecting lugs 40—40 are placed such that the pivotal axis 43 is offset from the center line of the lid or cover 30 and, in the preferred embodiment, that offset is one-half the width of 1 inch wide lugs 40—40 or ½ inch short of the geometric center of the lid. The lugs 40—40 are each made from a 2 ⅜ inch strip of 14 gauge metal bent to form a right angle iron with an upward projection of 1 ⅜ inches. The upwardly projecting length of fulcrum brackets 34—34 is selected to place the lever element 32 in a horizontal plane parallel to the flat portion of the lid in its closed position. The lever channel dimensions and the lug axis location within the channel leave a ⅜ inch space between the upper lid surface and the underside of the depending lever flanges. With a lid upper surface diameter of 10 inches and the ⅜ inch lid-to-lever spacing, the lid will tilt at an angle of approximately 4 ½° (angle B) when it is raised by the actuator mechanism. Therefore, in the preferred embodiment, ridge angle A is approximately 9° to give adequate clearance between the underside of lid ridge 31 and the neoprene seal 28.

The annular skirt wall 26 has a preferred diameter of 21 ⅝ inches and the rolled rim 27 has an annular opening ⅞ inch across to allow the rim to fit over the rolled lip 16 of the underground treatment chamber 10. The dimensions of the annular skirt and supporting structure were selected with particular reference to the diameter and rolled upper lip of standard 55-gallon drums. Such drums are readily available and are often used as collecting receptacles for dry solid waste and garbage. Thus, although the treatment chamber of the preferred embodiment employs a novel construction permitting nested shipment as previously indicated, the upper conduit unit of the invention can be detachably mounted upon a standard 55-gallon drum to form the garbage treatment system disclosed. Where a standard 55-gallon drum is to be used as the underground treatment chamber, its metal bottom must be cut out and removed so that as the cylindrical treatment chamber it will be open to the natural ground at its lower end.

The conical entrance conduit, together with its supporting structure and lid mechanism, can therefore be sold and shipped as a separate commercial item where the purchaser or user has access on location to standard 55-gallon drums. However, when a purchaser desires a complete garbage treatment receptacle, a treatment chamber assembled from the semi-cylindrical sections of the present invention are preferred as they permit shipment in a nested condition, greatly conserving shipping and storage space and the attendant costs.

With the novel garbage treatment system disclosed, it has been found that wet garbage can easily be separated and treated at the site of its origin. By way of example, the usual 55-gallon drum type trash can may be placed next to a wet garbage receptacle of the present invention as installed near camp sites in a state or national park, the former container being marked for dry garbage only and the latter for all wet garbage and organic food material. The two types of garbage are then easily separated and placed in the appropriate container by campers using the park. The dry garbage is collected periodically while the wet garbage receptacle need not be serviced for several years. The major portion of the wet garbage consists of water (85 percent) which separates and seeps into the ground after undergoing bacterial dehydration, leaving a 15 percent composted residue. A cup of a specially formulated bacterial culture is added every three or four months to speed up the bacterial action. The marked reduction in the bulk of the garbage through water dehydration accounts for the infrequent service requirements of the wet garbage treatment receptacle.

In addition to the foregoing advantages, the garbage treatment unit of the present invention can be easily constructed from sheet metal materials and may be readily installed in an underground pit or hole approximately 25 inches in diameter by 4 ½ feet in depth. After installation, the unit is completely weatherproof and sealed against intrusion by almost all insects and animals. The foot treadle and lid actuator mechanism disclosed is extremely strong and durable and is capable of satisfactory operation over extended periods of time without seal replacement. Furthermore, the snug fitting lid is strongly biased toward the closed position and is extremely difficult to raise by any means other than positive foot pressure upon the foot treadle 42.

Although but a single embodiment of the present invention has been described, other embodiments and variations will occur to those skilled in the art. It is possible, of course, to use various features of the specific embodiment described, whether separately or in various combinations, and such uses and combinations are within the contemplation of the present invention. Furthermore, many structural changes are possible and are also intended to be within the scope of this disclosure. It is to be understood that the drawing and specification merely illustrate and describe a preferred embodiment of the invention and other embodiments are within the scope of the appended claims.

I claim:

1. An organic garbage treatment receptacle comprising:
   1. garbage treatment chamber open at its upper and lower ends with supporting side walls therebetween, said lower end being adapted to rest upon a natural earth base;
   2. an upwardly projecting conical entrance conduit having a base adapted to be mounted over the upper end of said treatment chamber and an inlet portal for receiving organic garbage at the upper end of the projecting conduit, the incline of said conduit tapering inwardly from a wide base to a relatively narrow portal;
   3. lid means adapted to cover said conduit portal;
   4. seal means including an annular seal of resilient material mounted around the edge of said portal and adapted to form an airtight seal of substantial width between said portal and said covering lid; and
   5. lid actuating means including:
      a. a lever having an inner end adapted for pivotal connection to said lid and foot treadle means at the outer end thereof,
      b. means for pivotally mounting said lever upon the exterior surface of said entrance conduit with its fulcrum axis outside of the center of gravity of the actuating means, and
      c. means for pivotally connecting the inner end of said lever to the upper surface of said lid means with the pivotal axis of said connection being offset a sufficient distance from the center of gravity of said lid means toward the fulcrum axis of said lever to make the lid pivot firmly against the underside of said lever whenever raised clear of said portal seal means.

2. An organic garbage treatment receptacle as claimed in claim 1 wherein said lid connecting means includes at least one bracket rigidly secured at its base to the upper lid surface and adapted to be pivotally connected to the inner end of said actuator lever with a pivotal axis offset of at least one-half the width of the base of said bracket as measured in the direction of said fulcrum axis.

3. An organic garbage treatment receptacle as claimed in claim 1 wherein said conduit lid means includes a depending annular flange around its outer circumference, said flange being flared outwardly at an angle to the lid center axis of at least twice the angle through which the lid pivots when raised as measured between the longitudinal lever axis and a line normal to the lid center axis.

4. An organic garbage treatment receptacle as claimed in claim 1 wherein said garbage treatment chamber is cylindrical in shape and is comprised of two semi-cylindrical half sections facing each other with opposing longitudinal edges rigidly secured in closely adjacent relationship by fastening means including two pairs of opposing side flanges, one flange of each pair extending along a corresponding longitudinal edge of each of said opposing sections, said opposing flanges adapted to be rigidly secured together to form a unitary cylindrical treatment chamber.

5. An organic garbage treatment receptacle as claimed in claim 1 wherein said cylindrical treatment chamber has at least one lip means at the upper end thereof and the base of said entrance conduit includes an annular flange projecting outwardly around the circumference of the conduit and adapted to support said conduit upon the upper end of said chamber, a portion of said flange being rolled downwardly to form an annular channel adapted to fit over and engage said chamber lip means; said supporting flange being secured to said lip means by fastening means comprised of an annular band of arcuate cross-section adapted to over-lap and frictionally engage the upper surface of said support flange and the underside of said lip means, and tightening means adapted to pull the ends of said annular band together to bring its inner surface into clamping engagement with said flange and said lip means.

6. In an organic garbage treatment receptacle having an underground treatment chamber open at its upper and lower ends, a conical entrance unit covering the upper end of said treatment chamber and adapted to convey the garbage to be treated from above the ground surface to the chamber below, said entrance unit including:
   1. a conical conduit section of frustum shape having a relatively narrow garbage receiving portal at the upper end thereof, said conical conduit being inclined inwardly from base to portal;
   2. base means adapted to support said conduit upon the upper end of said underground chamber with said portal extending a short distance above the ground surface;
   3. lid means adapted to cover said conduit portal;
   4. seal means adapted to form an airtight seal of substantial width between said portal and said covering lid means; and,
   5. lid actuating means adapted to open and close said lid means comprising:
      a. a lever having an inner end extending over the center portion of said lid means and foot treadle means at the outer end thereof, b. means for pivotally mounting said lever upon the wall of said conduit with the fulcrum axis of said mounting located outside of the center of gravity of the actuating means, and
c. means for pivotally connecting the inner end of said lever to said lid means with the pivotal axis of said connection offset a sufficient distance from the center of gravity of said lid means in the direction of said fulcrum axis to cause the lid to pivot firmly against the underside of said lever whenever raised clear of said portal seal.

* * * * *